United States Patent [19]

Elliot

[11] Patent Number: 4,866,018
[45] Date of Patent: Sep. 12, 1989

[54] ORGANOPHILIC CLAY MODIFIED WITH ZIRCONIUM ALUMINUM ORGANIC COMPLEXES

[75] Inventor: Donald R. Elliot, Louisville, Ky.

[73] Assignee: United Catalyst

[21] Appl. No.: 209,179

[22] Filed: Jun. 20, 1988

Related U.S. Application Data

[63] Continuation-in-part of Ser. No. 50,473, Mar. 26, 1987, abandoned, which is a continuation-in-part of Ser. No. 796,867, Nov. 12, 1985, abandoned.

[51] Int. Cl.[4] .............................................. C04B 33/00
[52] U.S. Cl. ................................... 501/148; 501/153; 501/102; 501/141; 501/145; 501/146
[58] Field of Search ............... 501/146, 148, 141, 145, 501/153, 102

[56] References Cited

U.S. PATENT DOCUMENTS

| | | | |
|---|---|---|---|
| 4,242,140 | 12/1980 | Alther | 501/146 |
| 4,569,923 | 2/1986 | Knudson | 501/148 |
| 4,623,398 | 11/1986 | Goodman | 501/148 |
| 4,631,091 | 12/1986 | Goodman | 501/148 |
| 4,695,511 | 9/1987 | Goodman | 501/148 |
| 4,743,305 | 5/1988 | Doidge | 501/148 |

FOREIGN PATENT DOCUMENTS 2158053 11/1985 United Kingdom ................ 501/146

*Primary Examiner*—William R. Dixon, Jr.
*Assistant Examiner*—James M. Hunter, Jr.
*Attorney, Agent, or Firm*—Herbert P. Price

[57] ABSTRACT

Organophilic clays useful for modifying the rheological properties of organic fluids are made from a smectite type clay, a quaternary ammonium compound and a zirconium-aluminum organic complex.

23 Claims, No Drawings

ORGANOPHILIC CLAY MODIFIED WITH ZIRCONIUM ALUMINUM ORGANIC COMPLEXES

CROSS REFERENCE TO RELATED APPLICATIONS

This is a continuation-in-part of application, Ser. No. 050,473, filed Mar. 26, 1987 now abandoned which is a continuation-in-part of application, Ser. No. 796,867 filed Nov. 12, 1985 now abandoned.

BACKGROUND OF THE INVENTION

The field of art to which this invention pertains is organophilic modified clays.

Organophilic clays which are compatible with organic liquids have been known for some time. Their preparation and various uses have been described in, for example, U.S. Pat. Nos. 2,531,427 and 2,966,506. As taught by these references, naturally occurring water dispersible clays, such as montmorillonite, are reacted with "onium" compounds to produce organic clay complexes which are compatible with organic liquids.

In order to obtain maximum dispersibility and maximum thickening or gelling efficiency using organophilic clays, it has been necessary to add a low molecular weight polar organic compound to the composition. Such polar organic compounds have been called polar activators, dispersants, dispersion aids, solvating agents, and the like. Methanol is an example of a useful polar compound.

Organophilic clays which are said to have enhanced dispersibility in organic systems without using a polar activator are described in U.S. Pat. No. 4,105,578. Such organophilic clays are made from the reaction of a smectite-type clay with a methyl benzyl dialkyl ammonium compound wherein the alkyl groups contain at least 16 carbon atoms.

Organophilic clays having enhanced dispersibility in organic systems are also described in U.S. Pat. No. 4,412,018. These compositions are made by reacting a smectite-type clay with an organic anion, such as an organic acid, and an organic cation, such as a quaternary ammonium compound.

Other organophilic clay are described in U.S. Pat. Nos. 4,434,075, 4,434,076 and 4,450,095.

A particular use for organophilic clays, such as those claimed in U.S. Pat. No. 4,105,578, is described in U.S. Pat. No. 4,081,496. As taught by this invention, the organophilic clay is mixed with an unsaturated aromatic monomer, e.g., styrene, to form a pregel which is then combined with an unsaturated polyester to form a thixotropic composition.

SUMMARY OF THE INVENTION

This invention is directed to easily dispersible organophilic clays made by modifying a smectite-type clay with a quaternary ammonium compound and a zirconium-aluminum organic complex.

The compositions of this invention are the reaction products of a smectite type clay having a cation exchange capacity of at least about 75 milliequivalents per 100 grams of clay and (A) a quaternary ammonium compound having the structural formula:

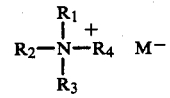

wherein $R_1$, is an alkyl group having about 12 to about 22 carbon atoms, wherein $R_2$, $R_3$ and $R_4$ are alkyl groups containing 1 to about 22 carbon atoms, aryl groups containing six to 22 carbon atoms, and aralkyl groups containing 7 to 22 carbon atoms and wherein M is chloride, bromide, iodide, nitrite, nitrate, sulfate, hydroxide or $C_1$ to $C_{18}$ carboxylate and (B) a zirconium aluminum organic complex which is the reaction product of (I) a chelated aluminum moiety made from an aluminum halohydrate and an alpha-beta or alpha-gamma glycol or an alpha hydroxy carboxylic acid, (II) an organofunctional ligand which is an alkyl, alkenyl, alkynyl or aralkyl carboxylic acid, an amino acid, a thioacid, a dibasic carboxylic acid or anhydride, or an epoxy functional carboxylic acid and (III) a zirconium oxyhalide. The quaternary ammonium compound (A) is reacted with the smectite type clay in the amount of about 50 to about 150 milliequivalents per 100 grams of clay and the zirconium-aluminum organic complex (B) is reacted in the amount of about 0.5 to about 5 weight percent based on the weight of the organophilic clay, i.e., the theoretical weight of the reaction product of the clay and the quaternary ammonium compound.

DESCRIPTION OF THE INVENTION

The clays used to prepare the compositions of this invention are smectite-type clays which have a cation exchange capacity of at least 75 milliequivalents per 100 grams of clay. Particularly desirable types of clays are the naturally occurring Wyoming varieties of swelling bentonites and like clays and hectorite, a swelling magnesium-lithium silicate clay.

The clays, especially the bentonite type clays, are preferably converted to the sodium form if they are not already in this form. This can be done by preparing an aqueous clay slurry and passing the slurry through a bed of cation exchange resin in the sodium form. Alternatively, the clay can be mixed with water and a soluble sodium compound such as sodium carbonate, sodium hydroxide and the like, followed by shearing the mixture with a pug mill or extruder.

The quaternary ammonium compounds used in this invention contain at least one alkyl substituent on the nitrogen atom having at least 12 carbon atoms up to about 22 carbon atoms. The other nitrogen substituents are (a) linear or branched alkyl groups having 1 to about 22 carbon atoms, (b) aralkyl groups, such as benzyl and substituted benzyl, (c) aryl groups, such as phenyl and substituted phenyl and (d) hydrogen. The quaternary ammonium compound can be represented by the structural formula:

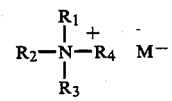

wherein M is an anion, such as chloride, bromide, iodide, nitrite, nitrate, sulfate, hydroxide, $C_1$ to $C_{18}$ carboxylate, and the like and wherein $R_1$ is an alkyl group having 12 to about 22 carbon atoms and $R_2$, $R_3$ and $R_4$ are hydrogen, alkyl groups containing 1 to about 22 carbon atoms, aralkyl groups containing 7 to 22 carbon atoms, aryl groups containing 6 to 22 carbon atoms and mixtures thereof. Preferred quaternary ammonium compound are those wherein $R_1$ and $R_2$ are alkyl groups having 12 to 22 carbon atoms and $R_3$ and $R_4$ are methyl, those wherein $R_1$ is an alkyl group having 12 to 22 carbon atoms, $R_2$ is benzyl and $R_3$ and $R_4$ are methyl, or mixtures thereof.

Other alkyl groups which can be present in the quaternary ammonium compound are such groups as methyl, ethyl, propyl, butyl, hexyl, 2-ethylhexyl, decyl, dodecyl, lauryl, stearyl and the like.

Aryl groups include phenyl and substituted phenyl. Aralkyl groups include benzyl and substituted benzyl groups.

Examples of useful quaternary ammonium compounds are dimethyl di(hydrogenated tallow) ammonium chloride, methyl tri(hydrogenated tallow) ammonium chloride, dimethyl benzyl hydrogenated tallow ammonium chloride, methyl benzyl di(hydrogenated tallow) ammonium chloride and the like. Preferred quaternary ammonium compounds are dimethyl di(hydrogenated tallow) ammonium chloride, dimethyl benzyl hydrogenated tallow ammonium chloride and mixtures thereof wherein the mixtures can contain 99 to 1 meqs of one compound to 1 to 99 meqs of the other compound. A particularly preferred mixture is one which contains equal meqs of each compound.

The zirconium aluminum organic complexes useful in this invention are described in U.S. Pat. Nos. 4,539,048 and 4,539,049 which are hereby incorporated by reference.

The zirconium aluminum organic complexes are the reaction product of (I) a chelated aluminum moiety made from an aluminum halohydrate and an alpha-beta or alpha-gamma glycol or an alpha hydroxy carboxylic acid, (II) an organofunctional ligand which is an alkyl, alkenyl, alkynyl or aralkyl carboxylic acid, an amino acid, a thioacid, a dibasic carboxylic acid or anhydride, or an epoxy functional carboxylic acid and (III) a zirconium oxyhalide.

The chelated aluminum moiety can be represented by the formula:

$$Al_2 (OR_1O)_a A_b B_c$$

wherein A and B are halogen or hydroxy, preferably chloro or hydroxy, a is a number ranging from about 0.05 to 2, preferably 0.1 to 1, and b and c are each numbers ranging from 0.05 to 5.5, preferably about 1 to 5, provided that $2a+b+c=6$. Most preferably, A is hydroxy and b ranges from 1 to 3.8. —$OR_1O$— is a bidentate chelating ligand which joins 2 aluminum atoms. —$OR_1O$— can be an alpha, beta or alpha, gamma glycol in which $R_1$ is an alkyl, alkenyl, or alkynyl group having from 1 to 6 carbon atoms, preferably an alkyl group having 2 or 3 carbon atoms. —$OR_1O$— can also be an alpha-hydroxy carboxylic acid residue —OCH($R_3$)— COOH wherein $R_3$ is H or an alkyl group having 1 to 4 carbon atoms. Preferably $R_3$ is H or methyl. In each instance, the organic ligand is bound to two aluminum atoms through two oxygen heteroatoms.

The zirconium oxyhalide can be represented by the formula:

$$Zr\ A_d B_e$$

wherein A and B are the same as described above and d and e each or numbers from 0.05 to 4 provided that $d+e=4$. Preferably, there is at least one hydroxy group and one halogen group in the zirconium reactant. Most preferably, the ratio of hydroxy to zirconium is from about 1 to 2 and the ratio of halogen to zirconium is about 2 to 3.

The organofunctional ligand can be represented by the formula:

$$-OC(R_2)O$$

which can be derived from one of, or a combination of the following groups:

(1) An alkyl, alkenyl, alkynyl, aryl or aralkyl carboxylic acid having from 2 to 18 carbon atoms, preferably 2 to 6 carbon atoms;

(2) An aminofunctional carboxylic acid having from 2 to 18 carbon atoms, preferably 2 to 6 carbon atoms;

(3) A dibasic carboxylic acid having from 2 to 18 carbon atoms wherein both carboxy groups are preferably terminal, the preferred range being 2 to 6 carbon atoms;

(4) Acid anhydrides of dibasic acids having from 2 to 18 carbon atoms, the preferred range being 2 to 6 carbon atoms;

(5) A mercapto functional carboxylic acid having from 2 to 18 carbon atoms, the preferred range being 2 to 6 carbon atoms;

(6) An epoxy functional carboxylic acid having from 2 to 18 carbon atoms, preferably from 2 to 6 carbon atoms.

The zirconium aluminum organo complex involves the chelated aluminum moiety bridged to the zirconium oxychloride moiety through the organofunctional ligand. This complex can be empirically represented by the formula:

$$[Al_2(OR_1O)_a A_b B_c]_x [O\ C\ (R_2)O]_y [ZrA_d B_e]_z$$

wherein A, B, $R_1$ and $R_2$ are as defined above, and a, b, c, d and e are also as defined above, except that in order to form the depicted bonds, the substituents attached to the metal groups are appropriately reduced, i.e., $2a+b+c=4$ ($2a+b+c=5$ when the aluminum moiety is a terminal group) and $d+e=2$ ($d+e=3$ when the zirconium moiety is a terminal group). When the aluminum moiety or the zirconium moiety forms the terminus in the molecular chain, one of the A or B groups may be replaced by a lower alkoxy group having 1 to 6 carbon atoms. X, Y and Z are at least one and can vary from 1 to 100 depending on the reactivity of the particular materials and the desired form of the product. The molar ratio of aluminum moiety to zirconium moiety (X to Z) may vary from about 1.5 to 10 with the preferred ratio being about 3 to 6. The ratio of organofunctional ligand to total metal ($Y/(2X+Z)$) varies from about 0.05 to 2.0 and, preferably, about 0.1 to 0.5.

An example of a useful zirconium aluminum metalloorganic complex is made by complexing aluminum chlorohydrate with 1,2-propylene glycol which is then reacted with zirconium oxychloride and adipic acid. Infrared spectroscopy indicates that the product is a hybrid complex in which one carboxy group of adipic acid forms a complex bridge between the aluminum and zirconium metal centers and the other carboxy group remains uncomplexed.

Other particularly useful complexes are those wherein the complexing bridge between the aluminum and zirconium metal centers is made from myristic acid, methacrylic acid, aminopropionic acid and mercaptopropionic acid, benzoic acid and phenylacetic acid.

The compositions of this invention contain about 50 to about 150 meqs of the quaternary ammonium compound based on 100 grams of clay on a 100 percent active basis, and, preferably, about 80 to about 130 meqs. The amount of aluminum-zirconium organic complex reacted in the compositions of this invention is about 0.5 to about 5 weight percent based on the theoretical weight of the reaction product of the clay and the quaternary ammonium compound and, preferably, about 1 to about 2.5 weight percent.

The organophilic clay of this invention can be further modified by the incorporation of hydrogenated castor oil. It has been found that the thixotropic properties of the organophilic clays can be improved by the addition of up to about 25 weight percent hydrogenated castor oil wherein the weight percent is based on the total weight of organophilic clay and hydrogenated castor oil.

In preparing the organophilic clays of this invention, the smectite type clays are slurried in water at a concentration of about 1 to about 10 weight percent. The clay slurry is then filtered and/or centrifuged to remove impurities, such as sand particles. The cleaned slurry has a concentration in water of about 1.5 to about 5 weight percent and is heated to about 40° C. to about 95° C., preferably about 60° C. to about 75° C. The quaternary ammonium compound and the zirconium aluminum organo-complex are added. Agitation and heating are continued for about 15 minutes to about 2 hours to complete the reaction of the compounds with the clay. When the reaction is completed, the excess water is removed and the organophilic clay is dried.

The compositions of this invention can be used as rheological additive in a wide variety of non-aqueous liquid systems. These clays are useful in paints, varnishes, enamels, waxes, adhesives, inks, laminating resins, gel coats and the like. The clays can be incorporated into the non-aqueous liquids using colloid mills, roller mills, ball mills and high speed dispersers.

The compositions of this invention are particularly useful for preparing thixotropic crosslinkable compositions from unsaturated polyesters and unsaturated aromatic monomers. Unsaturated polyester compositions prepared from unsaturated acids or anhydrides and aliphatic diols in admixture with unsaturated monomers, e.g., styrene, are converted to crosslinked thermoset compositions by peroxide cure catalysis. Such compositions are particularly useful in the preparation of glass fiber laminates. Thixotropic agents, such as the organophilic clays of this invention, are added to such polyester compositions in order to have workable low viscosities at high shear, such as is developed in mixing and spraying, and high viscosities at low or no shear to prevent flow and drainage of the polyester compositions when applied to vertical surfaces.

The compositions of this invention can be used in both the "pregel" and the "direct add" process. The "pregel" process involves dispersing the organophilic clay in the styrene portion of the thermosetting polyester composition to form a gel. Just prior to use, this gel is then mixed in with the polyester. In the "direct add" process, the organophilic clay is added and dispersed in the solution of polyester and styrene. The organophilic clays of this invention are used with the unsaturated polyester-aromatic monomer compositions in the amount of about 0.5 to about 2 weight percent based on the weight of the polyester composition.

The following examples describe the invention in more detail. Parts and percentages are by weight unless otherwise designated.

EXAMPLE 1

To a suitable container are added two thousand parts of an aqueous slurry of Wyoming bentonite at 1.8 percent solids which had previously been centrifuged to remove non-clay impurities. Agitation is begun and heat is applied raising the temperature to 75° C. To the slurry is added an aqueous emulsion of dimethyl di(hydrogenated tallow) ammonium chloride (DMD) in the amount of 90 milliequivalents (meqs) of the quaternary ammonium salt based on 100 grams of the clay. After mixing for 15 minutes at 75° C., 1 weight percent of a zirconium-aluminum organo complex is added, said weight percent being based on the theoretical weight of the reaction product of the quaternary ammonium chloride and the clay. The zirconium-aluminum organo complex is made by complexing aluminum chlorohydrate with 1,2-propylene glycol which is then reacted with zirconium oxychloride and adipic acid as taught by U.S. Pat. No. 4,539,048. The zirconium aluminum organo complex, which is available from Cavedon Chemical Co., Inc., Woonsochet, R.I. as CAVCO MOD C, is added as a solution, 22.7 weight percent active, in lower alcohols. After additional heating and mixing at 75° C., the organophilic clay product is recovered by filtration and is dried at 90° C. for 24 hours. The dried product is ground and screened through a 170 (U.S. Standard Sieve) screen.

A pregel is prepared by mixing until completely gelled 23 parts of styrene and 2 parts of the organoclay. This pregel is then combined with 177 parts of unsaturated polyester and styrene containing 67 weight percent polyester. The mixture is stirred at 2000 RPM for 15 minutes. The viscosity using a Brookfield Viscometer with a #3 spindle is determined at different RPM's after 1 hour, 24 hours and 1 week. The viscosity data are listed in Table 1.

TABLE 1

| Time | RPM | Viscosity, cps |
|---|---|---|
| 1 hour | 2.5 | 3600 |
| | 5 | 2600 |
| | 20 | 1310 |
| | 50 | 912 |
| 24 hours | 2.5 | 6000 |
| | 5 | 3960 |
| | 20 | 1845 |
| | 50 | 1156 |
| 1 week | 2.5 | 5760 |
| | 5 | 4040 |
| | 20 | 2030 |
| | 50 | 1408 |

EXAMPLE 2

Using the procedure described in Example 1, Wyoming bentonite is reacted with dimethyl di(hydrogenated tallow) ammonium chloride in the amount of 100 meqs based on 100 grams of the clay followed by reaction with various zirconium-aluminum organo complexes at 1 weight percent based on the theoretical weight of the organophilic clay. The zirconium-aluminum organo complexes are the reaction products of aluminum chlorohydrate complexed with 1,2-propylene glycol further reacted with zirconium oxychloride and an organofunctional ligand. The zirconium-aluminum organo complexes used in this example are identified as follows:

| CAVCO MOD- | Organofunctional ligand | % Solids in lower alcohols |
|---|---|---|
| M | methacrylic acid | 17.5 |
| M-1 | blend of myristic acid and methacrylic acid | 24.0 |
| A | aminopropionic acid | 24.5 |
| C | adipic acid | 22.7 |
| C-1 | adipic acid | 24.1 |
| F | myristic acid | 25.7 |
| S | mercaptopropionic acid | 22.9 |

The organophilic clays are used as thickeners for styrene and an unsaturated polyester resin using the procedure described in Example 1. The viscosity after 1 hour and 24 hours is shown in Table 2.

TABLE 2

| CAVCO MOD Time | RPM | M | M-1 | A | C | C-1 | F | S |
|---|---|---|---|---|---|---|---|---|
| 1 hr | 5 | 832 | 816 | 864 | 808 | 888 | 760 | 928 |
|  | 50 | 294 | 278 | 290 | 275 | 294 | 276 | 312 |
| 24 hours | 5 | 1920 | 2832 | 3256 | 824 | 1744 | 2056 | 2848 |
|  | 50 | 554 | 620 | 650 | 320 | 570 | 480 | 413 |

EXAMPLE 3

Using the procedure described in Example 1, a Wyoming bentonite slurry is reacted with 95 meqs of quaternary ammonium salt based on 100 grams of clay followed by reaction with 1 weight percent CAVCO MOD C based on the theoretical weight of the reaction product of the clay and quaternary ammonium salt. The quaternary ammonium salts used in this example are dimethyl di(hydrogenated tallow) ammonium chloride (DMD) and dimethylbenzyl hydrogenated tallow (DBT) and mixtures thereof. These salts shown n Table 3 are identified as follows:

| Quat | DMD meq. | DBT meq. |
|---|---|---|
| A | 95 | 0 |
| B | 71 | 24 |
| C | 47.5 | 47.5 |
| D | 24 | 71 |
| E | 0 | 95 |

The organophilic clays are used as thickeners for styrene-polyesters using the procedure described in Example 1. Hydrogenated castor oil in the amount of 25 weight percent based on the weight of the clay, quaternary ammonium salt and zirconium-aluminum organo complex is dry blended with the organophilic clay prior to use. The viscosities of the thickened styrene-polyesters are shown in Table 3.

TABLE 3

| Organoclay Time | RPM | A | B | C | D | E |
|---|---|---|---|---|---|---|
| 1 hr | 2.5 | 625 | 624 | 848 | 768 | 416 |
|  | 20 | 218 | 230 | 296 | 270 | 188 |
| 24 hrs | 2.5 | 1008 | 1008 | 1376 | 1280 | 736 |
|  | 20 | 330 | 334 | 388 | 384 | 272 |
| 48 hrs | 2.5 | 1232 | 1232 | 1440 | 1536 | 1008 |
|  | 20 | 352 | 366 | 414 | 426 | 316 |
| 72 hrs | 2.5 | 1232 | 1328 | 1520 | 1520 | 1008 |
|  | 20 | 374 | 396 | 440 | 440 | 348 |
| 1 week | 2.5 | 1536 | 1648 | 1792 | 1872 | 1456 |
|  | 20 | 452 | 468 | 504 | 510 | 424 |

EXAMPLE 4

Using the procedure described in Example 1, a Wyoming bentonite slurry is reacted with 130 meqs of dimethyl di(hydrogenated tallow) ammonium chloride followed by reaction with 1 weight percent, based on the theoretical weight of the reaction product of the clay and salt, of zirconium-aluminum organo complexes identified in Example 2. The dried organophilic clays are then evaluated for dispersibility and viscosity efficiency using the following procedure:

A resin solution, 190 grams, is added to a beaker along with 2 grams of a stock solution of zirconium, calcium and cobalt driers. The beaker is placed on a Dispermat mixer set at 500 RPM. The organophilic clay, 10 grams, is added and mixing at 500 RPM is continued for 20 minutes. A Hegman grind reading is then taken. Mixing at 1750 RPM is conducted for 2 minutes. Mixing is discontinued and after 1 hour, the viscosity using a Brookfield RVT viscometer is determined at 0.5 and 100 RPM.

One of the resin solutions used in these evaluations is a long oil soya alkyd at 50 percent solids in mineral spirits. The other resin solution is a fast drying chain stopped alkyd at 50 percent solids in xylene.

The fineness of dispersion, referred to as Hegman grind, is measured according to ASTM D1210-78. This measurement is made using a Hegman fineness of grind gauge rated in a scale range of 0 to 8 where 0 is equal to a film thickness of 4 mils and 8 is equal to a film thickness of zero mils. The grind gauge is a stainless steel block in which a channel of continually varying depth has been cut out. The solution to be tested is placed in the channel at the deepest end and is cast down the full length of the channel. The fineness of grind of the system is determined at the point along the channel depth at which the pigment particles are first visible above the surface of the solution film.

The evaluation results are listed in Table 4.

TABLE 4

| Clay | MOD C | MOD M | MOD A | MOD F | MOD M-1 |
|---|---|---|---|---|---|
| Soya Alkyd | | | | | |
| Hegman Grind | 1 | 0 | 2.5–3.0 | 3.5 | 5 |
| Viscosity | | | | | |
| 0.5 RPM | 4520 | 3000 | 5900 | 4160 | 9100 |
| 100 RPM | 152 | 130 | 165 | 140 | 203 |
| Chain Stopped Alkyd | | | | | |
| Hegman Grind | 2 | 1 | 4 | 4.5 | 5.5 |
| Viscosity | | | | | |
| 0.5 RPM | 34,400 | 32,960 | 32,720 | 31,920 | 36,480 |
| 100 RPM | 746 | 668 | 679 | 731 | 869 |

EXAMPLE 5

To a suitable container are added two thousand parts of an aqueous slurry of Wyoming bentonite at 1.8 percent solids which had previously been centrifuged to remove non-clay impurities. Agitation is begun and heat is applied raising the temperature to 75° C. To the slurry is added an aqueous emulsion of a mixture of dimethyl di(hydrogenated tallow) ammonium chloride (DMD) and dimethylbenzyl hydrogenated tallow ammonium chloride (DBT) in the amount of 47.5 milliequivalents (meqs) of DMD and 47.5 meqs of DBT based on 100 grams of the clay. After mixing for 15 minutes at 75° C., 1 weight percent of CAVCO MOD C is added, said weight percent being based on the theoretical weight of the reaction product of the quaternary ammonium chlorides and the clay. After additional heating and mixing at 75° C., the organophilic clay product is recovered by filtration and is dried at 90° C. for 24 hours. The dried product is ground and screened through a 170 mesh (U.S. Standard Sieve) screen. Hydrogenated castor oil (HC) is blended with the organophilic clay in the amount of 25 weight percent based on the weight of the blend.

An unsaturated polyester-styrene composition is modified with the organophilic clay-hydrogenated castor oil blend in the amount of 1 percent by weight based on the total weight of the composition. Five grams of the polyester composition are poured on a 3"×5" glass matt and is worked into the matting with a spiral laminating roller until air is removed. The matt is then placed at a 75° angle and is observed for 48 hours. No drain-out is noted. Drain-out of 96 percent is observed after 24 hours with a polyester composition modified with fumed silica.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed:

1. An organophilic clay comprising the reaction product of:
   (a) a smectite type clay having a cation exchange capacity of at least about 75 milliequivalents per 100 grams of clay on a 100 percent active basis;
   (b) a quaternary ammonium compound having the structure:

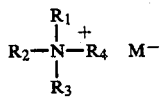

wherein $R_1$ is an alkyl group having about 12 to about 22 carbon atoms, wherein $R_2$, $R_3$ and $R_4$ are alkyl groups containing 1 to about 22 carbon atoms, aryl groups containing 6 to 22 carbon atoms, and aralkyl groups containing 7 to 22 carbon atoms, and wherein M is chloride, bromide, iodide, nitrite, nitrate, sulfate, hydroxide or $C_1$ to $C_{18}$ carboxylate; and
   (c) a zirconium-aluminum organic complex which is the reaction product of (i) a chelated aluminum moiety made from an aluminum halohydrate and an alpha-beta or alpha-gamma glycol or an alpha-hydroxy carboxylic acid, (ii) an organofunctional ligand which is an alkyl, alkenyl, alkynyl, or aralkyl carboxylic acid, an amino acid, a thioacid, a dibasic carboxylic acid or anhydride, or an epoxy functional carboxylic acid and (iii) a zirconium oxyhalide.

2. The composition of claim 1 wherein the quaternary ammonium compound is present in the amount of about 50 to about 150 meqs per 100 grams of clay, 100 percent active basis, and wherein the zirconium-aluminum organic complex is present in the amount of about 0.5 to about 5 weight percent based on the theoretical weight of the reaction product of the clay and the quaternary ammonium compound.

3. The composition of claim 2 wherein the quaternary ammonium compound is present in the amount of about 80 to about 130 meqs and the zirconium-aluminum organic complex is present in the amount of about 1 to about 2.5 weight percent.

4. The composition of claim 1 wherein $R_1$ and $R_2$ of the quaternary compound contain 12 to 22 carbon atoms and $R_3$ and $R_4$ are methyl.

5. The composition of claim 1 wherein $R_1$ of the quaternary compound is an alkyl group containing 12 to 22 carbon atoms, $R_2$ is aryl or aralkyl and $R_3$ and $R_4$ are methyl.

6. The composition of claim 1 wherein the quaternary ammonium compound is dimethyl di(hydrogenated tallow) ammonium chloride.

7. The composition of claim 1 wherein the quaternary ammonium compound is dimethylbenzyl hydrogenated tallow ammonium chloride.

8. The composition of claim 1 wherein the quaternary ammonium compound is a mixture of dimethyl di(hydrogenated tallow) ammonium chloride and dimethylbenzyl hydrogenated tallow ammonium chloride.

9. The composition of claim 8 wherein the mixture contains equal amounts of each quaternary ammonium compound on an equivalent weight basis.

10. The composition of claim 1 wherein the zirconium-aluminum organic complex is made of a complex of aluminum chlorohydrate and 1,2-propylene glycol which is then reacted with zirconium oxychloride and an organofunctional ligand.

11. The composition of claim 10 wherein the organofunctional ligand is a dibasic carboxylic acid having from 2 to 6 carbon atoms.

12. The composition of claim 11 wherein the dibasic carboxylic acid is adipic acid.

13. The composition of claim 10 wherein the organofunctional ligand is an alkenyl carboxylic acid having 3 to 6 carbon atoms.

14. The composition of claim 13 wherein the acid is methacrylic acid.

15. The composition of claim 10 wherein the organofunctional ligand is an alkyl carboxylic acid having 2 to 22 carbon atoms.

16. The composition of claim 15 wherein the acid is myristic acid.

17. The composition of claim 10 wherein the organofunctional ligand is an aminofunctional carboxylic acid having 2 to 6 carbon atoms.

18. The composition of claim 17 wherein the acid is aminopropionic acid.

19. The composition of claim 10 wherein the organofunctional ligand is a mercapto functional carboxylic acid having 2 to 6 carbon atoms.

20. The composition of claim 19 wherein the acid is mercaptopropionic acid.

21. The composition of claim 10 wherein the organofunctional ligand is benzoic acid.

22. The composition of claim 10 wherein the organofunctional ligand is phenylacetic acid.

23. The composition of claim 1 which contains up to 25 weight percent, based on the weight of the total composition of hydrogenated castor oil.

* * * * *